United States Patent [19]

Katayama

[11] Patent Number: 5,036,750

[45] Date of Patent: Aug. 6, 1991

[54] PILOT-OPERATED DUAL CHECK VALVE ASSEMBLY WITH CROSS-LINE FLOW VALVING PILOT PISTONS

[75] Inventor: Yuji Katayama, Kakogawa, Japan

[73] Assignee: Nippon Air Brake Kabushiki Kaisha, Kobe, Japan

[21] Appl. No.: 534,508

[22] Filed: Jun. 7, 1990

[30] Foreign Application Priority Data

Aug. 29, 1989 [JP] Japan .............................. 1-101388[U]

[51] Int. Cl.[5] ............................................ F16K 15/18
[52] U.S. Cl. ........................................ 91/464; 91/420; 91/445; 137/596.2
[58] Field of Search ................. 91/420, 445, 447, 461, 91/464; 137/596.2

[56] References Cited

U.S. PATENT DOCUMENTS 3,274,902  9/1966  Kleckner .............................. 91/420
3,908,515  9/1975  Johnson ................................ 91/420
4,286,432  9/1981  Burrows et al. ..................... 91/420 X

FOREIGN PATENT DOCUMENTS 21115  2/1988  Japan.

Primary Examiner—Edward K. Look
Assistant Examiner—George Kapsalas
Attorney, Agent, or Firm—Morris Fidelman; Franklin D. Wolffe

[57] ABSTRACT

A double operate check valve used in a hydraulic pressure circuit for locking and unlocking a vibration absorbing hydraulic cylinder included in a wheel suspension mechanism of a vehicle, which includes an improvement in its structure for providing the suspension with improved compliance with respect to road surface undulation and corresponding comfortable drive of the vehicle. The check valve pilot pistons have fluid conducting surfaces which are connected by a valve body passageway and which communicate the main fluid paths when hydraulic pressure in the pilot chamber urges the pilot pistons to open the check valves.

3 Claims, 2 Drawing Sheets

PILOT-OPERATED DUAL CHECK VALVE ASSEMBLY WITH CROSS-LINE FLOW VALVING PILOT PISTONS

BACKGROUND OF INVENTION

This invention relates to a double operate check valve inserted in a hydraulic circuit for locking and unlocking a hydraulic cylinder used in a suspension system for a vehicle such as automotive travelling crane.

When an automotive travelling crane moves as it hangs a load, its suspensions are subjected to expansion and contraction which are liable to result in unstable travelling attitude. In order to avoid such trouble, there has been provided a hydraulic circuit which can lock and unlock the suspensions as disclosed in the Japanese Utility Model Publication No. S63-21115.

As shown in FIG. 1, the disclosed hydraulic circuit includes hydraulic cylinders 10 each disposed between a cylinder frame 40 and a spring which suspends a wheel 42 on the frame 40, as shown in FIG. 4. The suspensions are locked by feeding compressed oil to the cylinders 10 and unlocked by connecting the cylinders 10 to an oil tank. The circuit also includes double operate check valves 11 each connected to input and output ports 10A and 10B of each hydraulic cylinder 10 as shown in detail in FIG. 2.

As shown in FIG. 2, the double operate check valve 11 includes a valve body 1 having both ends closed with plugs 1a and 1a, a pair of parallel fluid paths 2 and 2 for feeding compressed oil to the cylinder 10 and discharging it therefrom and a pair of valve mechanisms 3 and 3 disposed in the way of the fluid paths 2 and 2. Each valve mechanism 3 comprises a valve seat 4, a poppet valve 5 and a spring 6 for urging the poppet valve 5 against the valve seat 4. The poppet valve 5 comprises a check valve 7 urgeable against the valve seat 4 and a small valve 8 sliding within the check valve 7, and the small valve 8 is urged toward the check valve 7 by the spring 6.

A cylindrical insert hole 9 connecting both fluid paths 2 and 2 is formed in the valve body 1 and a pair of pilot pistons 13 and 13 are inserted therein so that they can slide in the insert hole 9 and touch the poppet valves 5 and 5, respectively. A pilot chamber 14 is provided between both pilot pistons 13 and 13 and adapted to be fed with compressed oil through a pilot piping 21 from a compressed pilot oil source 19 by switching a switch valve 20 to a switch position 20B.

When a switch valve 17 is in its neutral position 17A and the switch valve 20 is in its mormal position 20A, as shown in FIG. 2, the pilot chamber 14 is connected through the pilot piping 21 to the oil tank, so that each check valve 7 is pushed by the spring 6 through the small valve 8 against the valve seat 4 to close it. Accordingly, hydraulic chambers 10C and 10D of each cylinder 10 are closed and the corresponding suspension is locked.

If the switch valve 17 is switched to its switch position 17B, a pump 18 is connected to a piping 16 and a piping 15 is connected to the oil tank. Therefore, the compressed oil from the pump 18 flows in one of the fluid paths 2 of the double operate check valve 11 and opens corresponding one of the valve mechanisms 3, so that it is fed to the hydraulic chamber 10D of the cylinder 10. The compressed oil flowing into the abovementioned fluid path 2 acts to the pilot pistons 13 and 13 and opens the other valve mechanism 3 to discharge the oil from the hydraulic chamber 10C of the cylinder 10 to the oil tank, thereby contracting the cylinder 10.

When the switch valve 17 is switched to its switch position 17C, the pump 18 is connected to the piping 15 and the piping 16 is connected to the oil tank. Therefore, the compressed oil from the pump 18 flows into the other fluid path 2 on the doubld operate check valve 11 and opens the corresponding valve mechanism 3, so that it is fed to the hydraulic chamber 10C of the cylinder 10. The compressed oil flowing in the abovementioned fluid path 2 acts to the pilot pistons 13 and opens the other valve mechanism 3 to discharge the oil from the hydraulic chamber 10D to the oil tank, thereby expanding the cylinder 10.

If the switch valve 17 is put in its neutral position 17A and the switch valve 20 is switched to its switch position 20B, the compressed pilot oil source 19 is connected to the pilot piping 21 and the compressed oil from the source 19 flows in the pilot chamber 14 of the double operate check valve 11 and acts to both pilot pistons 13 and 13 to open both valve mechanisms 3 and 3. Accordingly, both hydraulic chambers 10C and 10D of the cylinder 10 are connected through the switch valve 17 to the oil tank, thereby unlocking the cylinder 10 for free operation.

According to the prior art double operate check valve as described above, the switch valve 17 is put in its neutral position 17A to connect the pipings 15 and 16 to the oil tank and the switch valve 20 is switched to its switch position 20B to feed compressed pilot oil to the pilot chamber 14, thereby releasing the valve mechanisms 3 to unlock the suspension to allow it to absorb the vibration due to road surface undulation and to obtain comfortable drive.

However, the hydraulic chambers 10C and 10D of the cylinder 10 are adapted to connect to the oil tank through the double operate check valve 11 and the pipings 15 and 16 and these pipings are extended over the whole length of the vehicle. Therefore, the oil fed to and discharged from the hydraulic chambers 10C and 10D is subjected to substantial pipe resistance and the action of the cylinder 10 can not follow enough the vibration due to road surface undulation, thereby resulting in uncomfortable drive.

Therefore, an object of this invention is to reduce the amount of the oil fed to and discharged from the hydraulic cylinders of the vehicle suspensions so that the suspensions can sufficiently follow the road surface undulation, thereby enabling comfortable drive.

SUMMARY OF INVENTION

This object can be attained by an improved double operate check valve provided in accordance with this invention for controlling each hydraulic cylinder disposed in a hydraulic circuit of a vehicle suspension system, which comprises a valve body having a pair of parallel fluid paths for feeding compressed oil to the hydraulic cylinder, an insert hole connecting both fluid paths, a valve mechanism disposed in the way of each fluid path and composed of a valve seat and a poppet valve, a pair of pilot pistons slidably inserted in the insert hole so that they can touch the poppet valves of the respective valve mechanisms, and a pilot chamber formed between both pilot pistons. According to a feature of this invention, at least one depression is formed in the surface of each pilot piston and a passage way connecting the depressions of both pilot pistons is formed in the valve body, whereby allowing the depressions to connect the passageway to both fluid paths when a hydraulic pressure acts in the pilot chamber.

DESCRIPTION OF PREFERED EMBODIMENT

Figure 1:
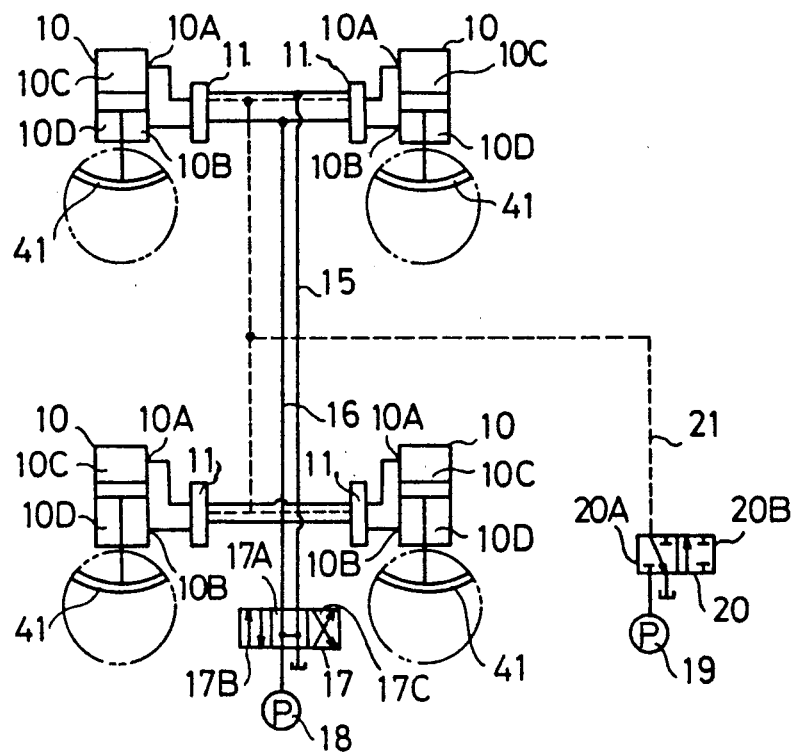
FIG. 1 is a schematic diagram representing a hydraulic circuit of a vehicle suspension system including double operate check valves in question.
Figure 2:
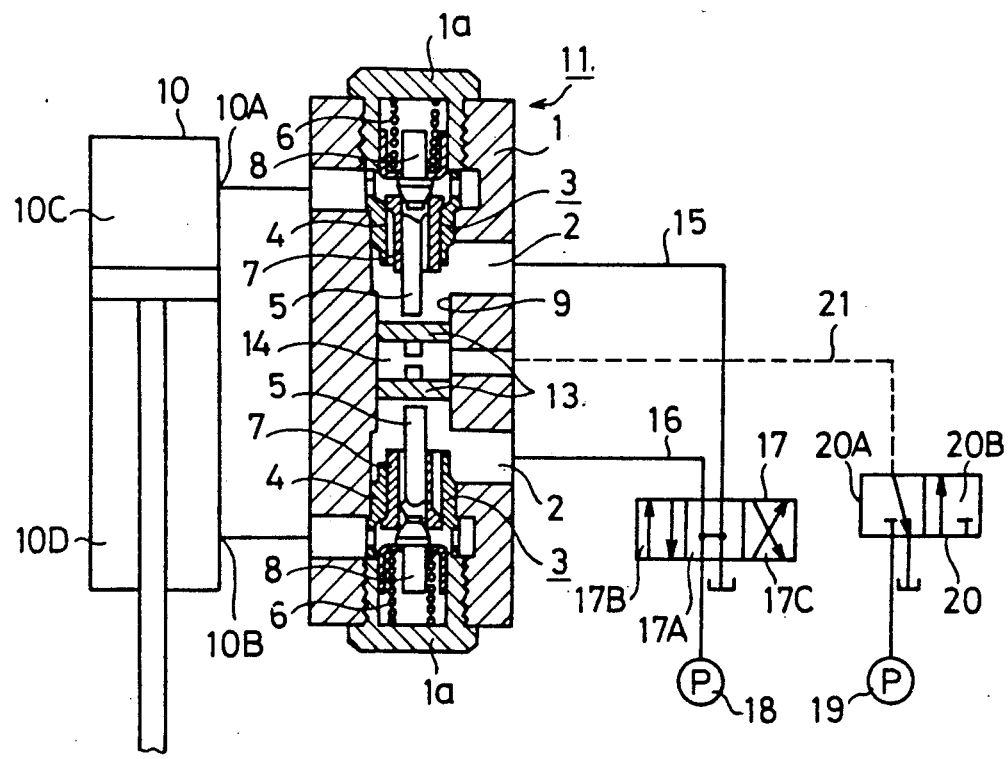
FIG. 2 is a sectional side view representing a double operate check valve according to the prior art.
Figure 3:
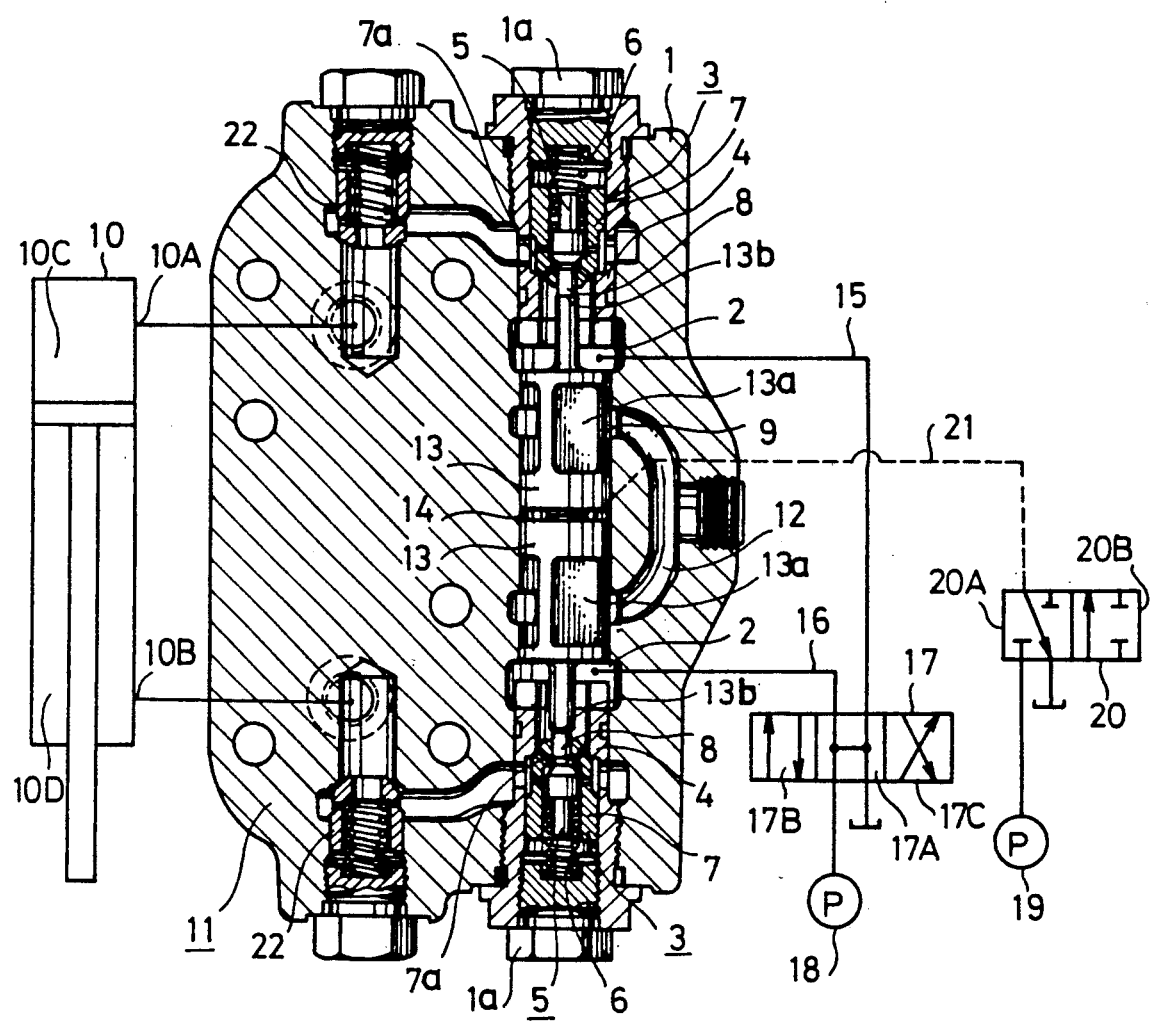
FIG. 3 is a sectional side view representing an embodiment of double operate check valve according to this invention.
Figure 4:
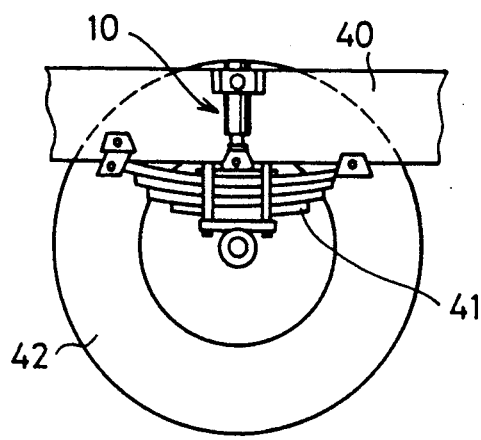
FIG. 4 is a side view representing a vehicle suspension mechanism including a hydraulic cylinder to be controlled by the double operate check valve.

Referring to FIG. 3 showing an improved double operate check valve 11 according to this invention, the same reference numerals as those of FIG. 2 are given to those structural components which are substantially same in both structure and operation as those of the prior art device as described above. Therefore, no description will be repeated on these components and the following description will be made only about peculiar differences of the invention from the prior art.

In the drawing, each pilot piston 13 of the improved double operate check valve 11 has three rectangular depressions 13a formed in its surface at equal circumferential intervals and a passageway 12 connecting the depressions 13a and 13a of both pilot pistons 13 and 13 is formed in the valve body 1. The depression 13a of each pilot piston 13 is disconnected from the corresponding fluid path 2 by the same pilot piston 13 when no pilot hydraulic pressure acts in the pilot chamber 14 as shown, while it is connected thereto to connect both fluid paths 2 and 2 through the passageway 12 when a hydraulic pressure acts in the chamber 14 to drive the pistons 13 and 13 in the opposite directions. Each fluid path 2 is also provided with a restrictor valve 22 for restricting the amount of the oil discharged from the cylinder 10 to control its speed of operation.

When the switch valve 20 is in its normal position 20A as shown in FIG. 3, the pilot chamber 14 of the double operate check valve 11 is connected through the pilot piping 21 to the oil tank and, therefore, both fluid paths 2 and 2 are disconnected from the passageway 12 by the respective pilot pistons 13 and 13. If the switch valve 17 is put in its neutral position 17A to lock the suspension and the switch valve 20 is switched to the switch position 20B, the compressed pilot oil from the source 19 flows through the pilot piping 21 into the pilot chamber 14 and drives both pilot pistons 13 and 13 to open both valve mechanisms 3 and 3. Accordingly, both hydraulic chambers 10C and 10D of the cylinder 10 are connected through the switch valve 17 to the oil tank and both fluid paths 2 and 2 are connected through the depressions 13a and 13a and the passageway 12. Accordingly, feed and discharge of the oil to and from the hydraulic chambers 10C and 10D of the cylinder 10 following the road undulation are effected almost through the connection between both fluid paths 2 and 2 within the double operate check valve 11 and the amount of the oil moving through the pipings 15 and 16 corresponds merely to the differential volume of the chambers 10C and 10D.

When the valve mechanisms 3 and 3 are closed to lock the suspension, if the switch valve 20 is switched to its switch position 20B to introduce a hydraulic pressure in the pilot chamber 14 in order to unlock the suspension, the small valve 8 is first pushed to open by the end 13b of each pilot piston 13 to discharge the oil from the hydraulic chambers 10C and 10D of the cylinder 10 through small holes 7a formed in the check valve 7, the fluid path 2, the piping 15 or 16 and the switch valve 17 to the oil tank and, thereafter, the check valve 7 is forcibly opened by the end 13b of the pilot piston 13. Such two-step motion can reduce severe shock caused at the start of unlocking of the suspension and also keep a large passage area in the valve mechanism 3 to reduce pressure loss.

As described above, both hydraulic chambers 10C and 10D of the cylinder 10 are connected together not only by the pipings 15 and 16 but also the depressions 13a and the passageway 12 when the suspension is unlocked, and oil exchange between both hydraulic chambers 10C and 10D responding to the road surface undulation is effected through these two channels. This results in significant reduction of flow resistance and corresponding improvement of suspenison compliance.

The above description has been made for illustrative purpose only and never means any limitation of the invention. It should be understood by those skilled in the art that various modifications and changes can be derived from the above-described embodiment without leaving the spirit and scope of the invention as defined in the appended claims. For example, the shape and number of the depressions 3a is optional. Even a single depression 13a may be enough for each pilot piston 13 so long as it can obtain the described effect. The passageway 12 may be disposed partly outside the valve body 1. It is a matter of course that the detailed structure of the valve mechanism 3 and other part of the valve can be modified arbitrarily.

I claim:

1. A double operate check valve for controlling a hydraulic cylinder of vehicle suspension, comprising
    a valve body including a pair of parallel fluid paths for feeding compressed oil to said hydraulic cylinder, and an insert hole connecting said fluid paths together,
    a pair of valve mechanisms each disposed in the way of each said fluid path and provided with a valve seat and a poppet valve,
    a pair of pilot pistons inserted slidably in said insert hole and adapted to touch said poppet valves of said respective valve mechanisms,
    a pilot chamber formed between said pilot pistons,
    at least one depression formed in the surface of each said pilot piston,
    a passageway for connecting said depressions of said pilot pistons,
    said fluid paths being adapted to be connected together through said depressions and said passageway when hydraulic pressure acting in said pilot chamber urges said pilot pistons against said valve mechanisms to open the same.

2. A double operate check valve as set forth in claim 1, wherein three depressions are formed in the surface of each said pilot piston at equal circumferential intervals.

3. A double operate check valve as set forth in claim 1, wherein said passageway is formed within said valve body.

* * * * *